United States Patent
Ilnickl et al.

(10) Patent No.: US 8,194,662 B2
(45) Date of Patent: Jun. 5, 2012

(54) INSPECTION OF DATA

(76) Inventors: Slawomir K. Ilnickl, Los Altos Hills, CA (US); Martin Curran-Gray, Fife (GB)

(*) Notice: Subject to any disclaimer, the term of this patent is extended or adjusted under 35 U.S.C. 154(b) by 695 days.

(21) Appl. No.: 11/450,805

(22) Filed: Jun. 8, 2006

(65) Prior Publication Data
US 2007/0286195 A1 Dec. 13, 2007

(51) Int. Cl.
*H04L 12/28* (2006.01)
*H04L 12/56* (2006.01)
*G06F 15/16* (2006.01)

(52) U.S. Cl. ........ 370/392; 370/389; 370/401; 709/201

(58) Field of Classification Search .......... 370/389–401, 370/469–538, 218–225, 334–465; 709/201–209, 709/232–236; 375/354–372
See application file for complete search history.

(56) References Cited

U.S. PATENT DOCUMENTS

| | | | | |
|---|---|---|---|---|
| 4,490,817 A * | 12/1984 | Turner | | 370/244 |
| 4,825,208 A * | 4/1989 | Mueller et al. | | 370/236 |
| 5,694,588 A * | 12/1997 | Ohara et al. | | 712/225 |
| 6,141,323 A | 10/2000 | Rusu et al. | | |
| 6,324,165 B1 | 11/2001 | Fan et al. | | |
| 6,714,537 B1 * | 3/2004 | Adam et al. | | 370/360 |
| 6,950,434 B1 * | 9/2005 | Viswanath et al. | | 370/392 |
| 6,996,735 B2 * | 2/2006 | Flores et al. | | 713/401 |
| 7,177,328 B2 * | 2/2007 | Miller | | 370/503 |
| 7,193,429 B2 * | 3/2007 | Okuyama | | 326/26 |
| 7,295,639 B1 * | 11/2007 | Cory | | 375/371 |
| 7,328,349 B2 * | 2/2008 | Milliken | | 713/181 |
| 7,346,701 B2 * | 3/2008 | Elzur et al. | | 709/232 |
| 7,366,091 B1 * | 4/2008 | Lahti et al. | | 370/218 |
| 7,411,957 B2 * | 8/2008 | Stacy et al. | | 370/392 |
| 7,599,459 B2 * | 10/2009 | Okuyama | | 375/372 |
| 7,610,330 B1 * | 10/2009 | Quinn et al. | | 709/201 |
| 7,668,107 B2 * | 2/2010 | Arad et al. | | 370/242 |
| 2004/0064737 A1 * | 4/2004 | Milliken et al. | | 713/201 |
| 2005/0111604 A1 * | 5/2005 | Okuyama | | 375/372 |
| 2005/0220240 A1 * | 10/2005 | Lesso | | 375/372 |
| 2008/0123622 A1 * | 5/2008 | Kaganoi et al. | | 370/351 |

FOREIGN PATENT DOCUMENTS
DE 29825153 12/2005

OTHER PUBLICATIONS

Jacobson, V., Braden, R., and Borman, D., Request for Comments: 1323, TCP Extensions for High Performance, May 1992, pp. 2-5.*
German Patent and Trademark Office, 4 month office action dated Jul. 27, 2009.

* cited by examiner

*Primary Examiner* — Man Phan
(74) *Attorney, Agent, or Firm* — Volentine & Whitt, PLLC

(57) ABSTRACT

An in-band inspection device receives a packet and/or frame, and inspects the packet and/or frame "on the fly." The device can accept, reject, and/or modify the received packet and/or frame in accordance with the inspection. The device can operate in a fast mode wherein the received packet and/or frame can be transmitted as soon as, for example, a port address in the packet and/or frame is received, or in a slow mode wherein the received packet frame is buffered until, for example, at least the CRC of the packet and/or frame is beginning to be received.

20 Claims, 4 Drawing Sheets

INSPECTION OF DATA

BACKGROUND

Existing techniques for packet/frame inspection and processing are based on what could be described as "out-of-band" processing. Out-of-band processing occurs when processing and forwarding a "packet/frame" (packet and/or frame) requires substantially more time than the time required for receiving the packet/frame. A packet/frame typically arrives at various networking elements as streams of bits. The various networking elements can include various components such as switches, routers, and firewalls or intrusion detection systems (IDS), which terminate the streams of bits at the transceiver port, where the packets and/or frames are then processed as units.

For example, when an Ethernet layer 2 switch receives an Ethernet frame, the Ethernet frame is forwarded to an output port that is defined by the Ethernet header. The switch can forward the frame as soon as the switch receives the Ethernet header bits (as in a "cut-through" device). Alternatively, the Ethernet frame can be forwarded after receiving and processing the entire Ethernet frame (as in a store and forward device). Receiving an Ethernet header typically occurs in around one microsecond when using the 100 BASET-T Ethernet standard. However, an Ethernet frame typically requires tens to hundreds of microseconds to process and forward. Routers typically may require even more time to forward packets than switches.

Conventional systems (which perform "out-of-band" processing) typically cannot forward a packet or frame using "in-band processing" because the inspection and processing typically require substantially more time than the time required for forwarding. Examples of inspection and processing by switches and routers can include blocking certain traffic based upon an access control list (ACL) by examining the frame/packet headers while performing the forwarding and routing function. Routers can also be tasked with firewall or IDS functions such as virus or worm checking. In addition to greater management burdens, such processing often requires that the processor withhold the frame or packet for substantially more time than the time required to forward the packet/frame.

SUMMARY

In general terms, this patent relates to in-band inspection of a packet and/or frame, and accepting, rejecting, and/or modifying the packet and/or frame "on the fly."

One aspect is an apparatus for in-band packet/frame inspection. The apparatus comprises an input module configured to receive a packet/frame, an elastic buffer configured to buffer the received packet/frame, an inspection module configured to inspect the received packet/frame and to provide at least one control signal to the elastic buffer in accordance with the inspection of the received packet/frame whereby the elastic buffer is modified; and an output module configured to transmit the one of data received from the elastic buffer and data received from the inspection module.

Another aspect is a method of inspecting and transmitting a packet/frame. The method comprises receiving a packet/frame, buffering the received packet/frame in an elastic buffer, inspecting the received packet/frame and providing at least one control signal to the elastic buffer in accordance with the inspection of the received packet/frame whereby the contents of the elastic buffer are modified. Data received from one of the elastic buffer and data received from the inspection module is transmitted.

DETAILED DESCRIPTION

Figure 1:
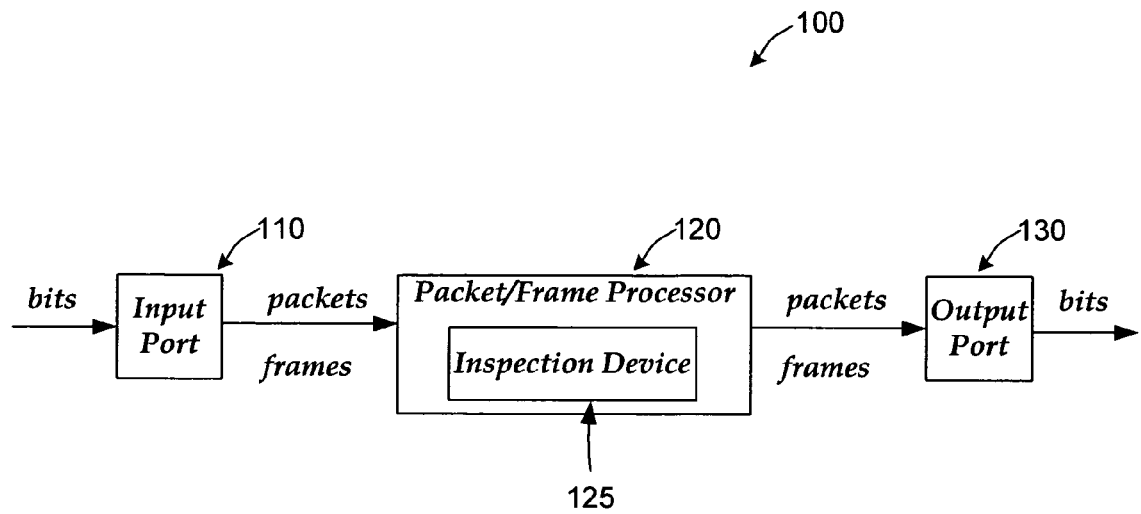
FIG. 1 illustrates a packet/frame processing system 100.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates a packet/frame processing system 100. The packet/frame-processing system 100 inspects an incoming packet and/or frame ("packet/frame"). The packet/frame processing system 100 can be a networking element such as a switch, router, firewall, or intrusion detection system (IDS). Streams of bits from other networking elements are received at input port 110, converted to words, which are then processed as units by the packet/frame processor 120. Inspection device 125 can be an in-band packet frame inspection device 200 which is discussed below with respect to FIG. 2. The process of processing an incoming packet (or frame) requires decoding the packet, verifying the packet CRC (cyclical redundancy check), processing the packet header, and calculating a new CRC for the processed unit. The processed unit is sent to the output port 130 where the units are serialized and transmitted as a bit stream.

"In-band" (or "in-line") processing permits packets and frames to be inspected without excessive delays that can violate protocol specifications for forwarding the packets and frames. Accordingly, received information can be forwarded without substantial delays while contemporaneously inspecting the packets and frames. Additionally, the packets and frames can be accepted, rejected and even modified "on the fly" such that the transmitted bit stream is not disturbed. If a frame, for example, does not need to be modified, it can be forwarded if the frame does not match packet filters.

In-band processing can be used, for example, to perform network measurements and diagnostics. One-way delays, in an example embodiment, can be measured by modifying packets to include a timestamp. The timestamp can be added to the IP (internet protocol) packet beyond the transport (e.g., TCP/UDP) packet payload. A small delay (as compared with the large delays of out-of-band processing) in forwarding the packet is introduced when trying to detect a particular packet because of the time used to examine IP and transport header bits of the packet.

The introduced delay is dependent upon the amount of time used for detection of a particular packet. For example, the delay will typically be the same time required for the transmission of data up to the port field when the destination port in the transport header is used for detection. The packet is usually withheld for at least this amount of time because of the time that is used to operate on the IP header (for the purpose of changing the IP packet length field and checksum (such as a CRC) of the IP header). Thus the packet is withheld long enough to determine whether, for example, a particular packet is to have a timestamp included. Including a timestamp alters the length of the IP packet, which is specified in the length field of the IP header. Modifying the length field can be accomplished when forwarding the packet such that a delay need not be used for modifying the changed length field.

As an example, a time synchronization bridge uses messages with time stamps for time synchronization over a LAN. A master clock can be used to insert a time by sending time values to one or more slave clocks. Timestamped messages passing thru switches/routers are often delayed for various intervals which results in unpredictable delays. The time synchronization bridge can modify master clock timestamps "on-the-fly" in IEEE 1588 messages. There are normally at least two such devices (minimum) on the switch/router: ingress and egress. The devices can have their clocks synchronized using an out-of-band channel.

When an IEEE 1588 message passes through the device, the ingress device typically inserts a timestamp in an available field in the IEEE 1588 message to indicate when the device handled the message. The egress device receives a typically "stale" timestamp from the ingress device when the message arrives in that device, and extracts the previously stored timestamp in the message (arrival time at the ingress device), By subtracting the ingress timestamp value from the egress timestamp value the delay caused by the switch/router can be calculated. The egress device adds the updated timestamp to the original master clock timestamp in the IEEE 1588 messages such that the switch/router (delay) is transparent to the IEEE 1588 system. In this example the function of inserting data is a way of passing information between devices. In various embodiments, measurement data can be collected by appending data when a packet is passed by the device.

Figure 2:
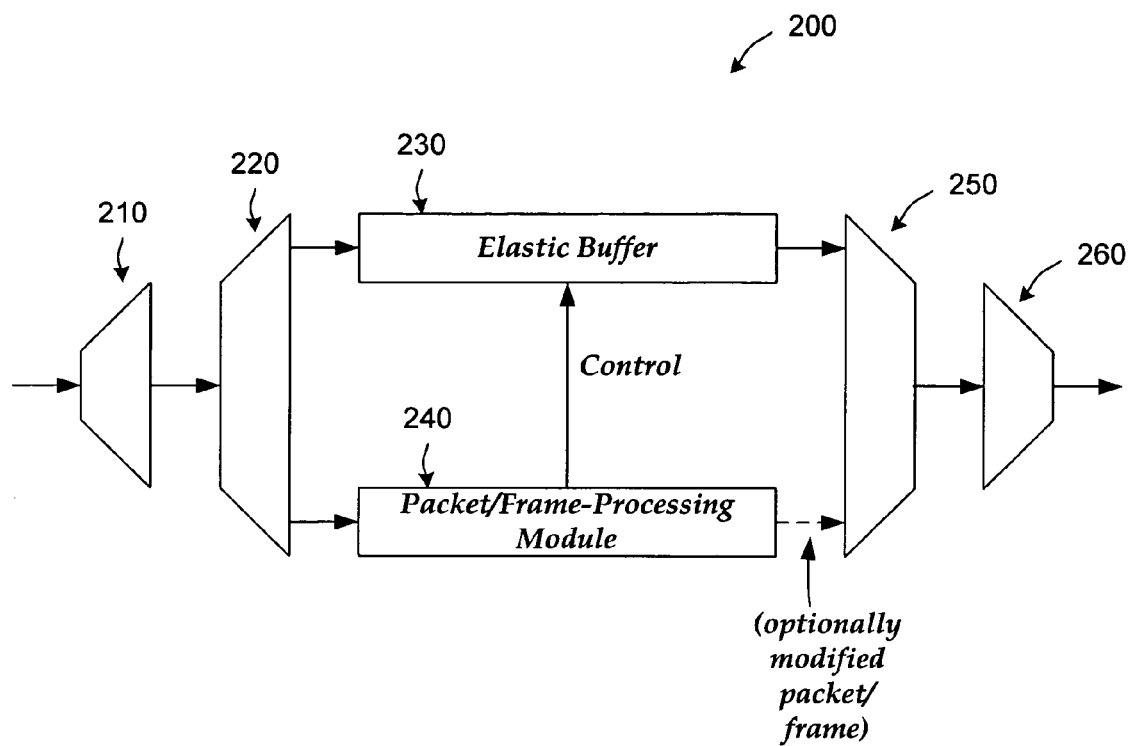
FIG. 2 illustrates an embodiment of an in-band packet frame inspection device 200.

FIG. 2 illustrates an embodiment of an in-band packet frame inspection device 200. Briefly stated, in-band packet frame inspection device 200 comprises an input demultiplexor 210 that de-serializes bits of an input bit stream so that the input data can be processed in parallel. The duplicator 220 creates two identical streams wherein a first stream is coupled to the elastic buffer 230, and a second stream is coupled to the packet/frame-processing module 240. The first stream is typically unaltered and traverses the elastic buffer 230 whose control may be impacted by signals from the packet/frame-processing module 240, which is contemporaneously processing the second stream.

The packet/frame processing module 240 can, for example, optionally inject packets into the stream. The packet/frame processing module 240 processes data as it arrives and sends a signal to the elastic buffer 230 if an action upon the data in the elastic buffer 230 is required. The MUX 250 typically forwards information from the elastic buffer 230; however, if there are any modifications to be performed on the packet or frame, the MUX 250 switches to receive information from the packet/frame-processing module 240. The packet/frame processing module 240 typically frames and encodes the modified frames in the same way as the unaltered data is encoded. Multiplexer 260 serializes the parallel data received from MUX 250 into a serial bit stream.

As introduced above, the in-band packet frame inspection device 200 produces two streams. A first stream is a stream of unaltered data that passes through elastic buffer 230 and a second stream is a stream of data that is used for packet/frame processing (such as inspection for particular port addresses, viruses, worms, and the like). The packet/frame processing may indicate that the first stream may need to be changed in some fashion. For example, a packet/frame can be removed ("ejected") from the data stream, or, a packet/frame can be modified by inserting a new packet/frame that could be a modification of the original packet/frame.

The in-band packet frame inspection device 200 can operate in a "fast" or "slow" mode (briefly discussed here, and individually discussed below). The fast mode allows the unaltered bit stream to pass the device with very little delay (when using the 1 GbE standard the delay is typically within the tens of nanoseconds range). However, the fast mode is not completely transparent to other networking elements that may receive this stream. The slow mode is not considered to be intrusive and can be completely transparent to other network elements. However, the slow mode typically introduces larger delays (when using the 1 GbE standard the delay is typically within the hundreds of nanoseconds range).

Figure 3:
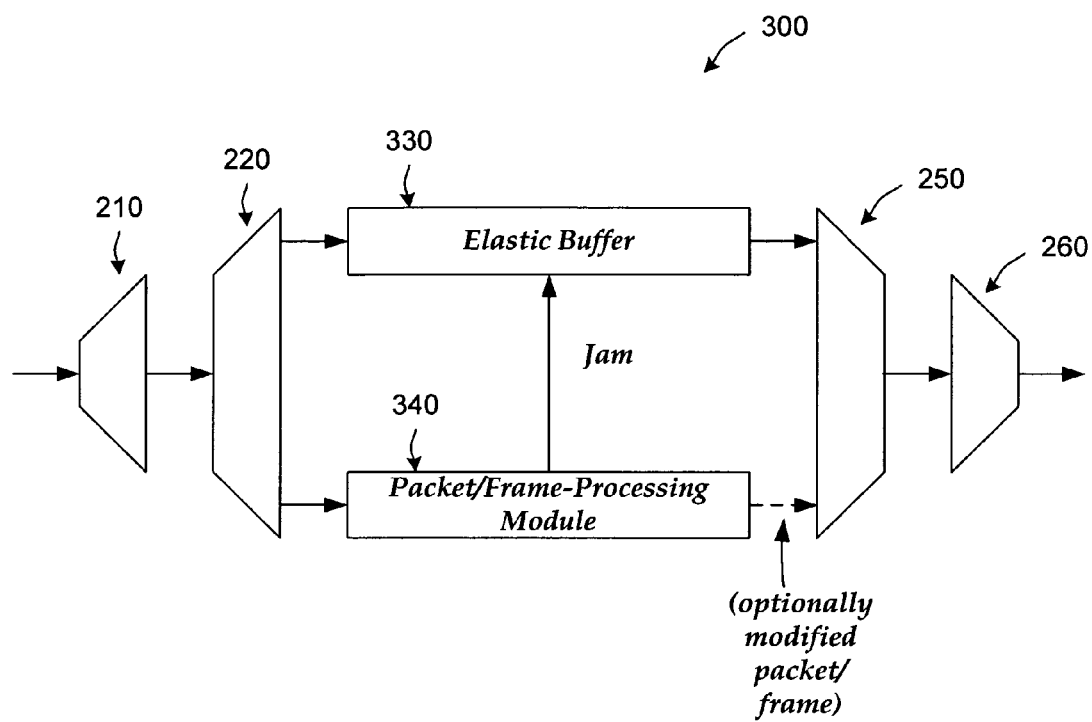
FIG. 3 illustrates an embodiment of an in-band packet frame inspection device 300 operating in the fast mode.

FIG. 3 illustrates an embodiment of an in-band packet frame inspection device 300 operating in the fast mode. In various embodiments, the in-band packet frame inspection device 300 operating in fast mode usually uses a relatively small elastic buffer 330 that is capable of holding at least two words. In the fast mode, the packet/frame processing module 340 typically uses only a "jam" signal. The packet/frame processing module 340 inspects an incoming packet/frame for (for example) a particular port, and determines whether the packet/frame should be removed. If the packet/frame-processing module 340 determines that the packet/frame that is in transit has to be removed, it jams the frame. In one embodiment, jamming modifies the frame on the fly by destroying the framing. The framing can be destroyed, for example, by sending idles without waiting to the end of frame delimiter. In another embodiment jamming of the packet/frame can be accomplished by replacing the valid checksum with an invalid one. In both embodiments the receiving end will normally report the errors (such as framing problems or bad checksums) and will not normally forward the packet/frame to the destination.

Sending frames with invalid checksums typically raises alarms at the receiving end network device receiving the invalid checksums. Alarms are also typically raised for network devices that receive damaged frames. Receiving an invalid packet/frame (which, for example, contains a bad checksum or damaged framing) usually causes a receiving network device to believe that there is actually a problem with the transmission medium (when in fact, none usually exists). To avoid this situation, the packet/frame processing module 340 keeps track of the checksum of each received frame and the number of frames that were purposely damaged. A network device used for monitoring checksum errors and associated alarms is used to correlate the results from an in-band packet frame inspection device 300 with the errors at the receiving port on the network element that receives the damaged frames.

For example, if the packet/frame processing module 340 is used to block specific ports (as is done on a firewall), the packet/frame-processing module 340 jams a frame, after detecting a port that is to be blocked. The jammed frame is not normally forwarded by the network element that receives the damaged frame because of either the bad checksum or bad framing.

The in-band packet frame inspection device 300 can also be used to modify a packet/frame on the fly, for example, by adding a timestamp. Timestamps can be used to determine delays packets/frames experience traveling through nodes. There are at least two cases for which a timestamp can be included. In one case, the packet/frame has a placeholder inside the packet/frame for the timestamp and in another case the original packet/frame is appended with new data. If a timestamp is added to an IP packet (for example) that already has a place for the timestamp then the link layer checksum is recalculated and replaced. If the IP packet is appended with a timestamp then the IP packet header is modified by changing the IP packet length and the packet/header checksum. The link layer checksum is replaced because the packet/frame has also been modified.

Inserting a timestamp when there is pre-allocated space in the packet/frame can be controlled by MUX 250. When packet/frame processing module 340 determines that the timestamp is to be included (in one of the streams passing thru elastic buffer 330 and packet/frame processing module 340, which are synchronized), then packet/frame processing module 340 instructs MUX 250 to switch streams so it will pickup timestamp data from 340 and withhold the data in elastic buffer 330. When the timestamp data leaves MUX 250, the control goes back to elastic buffer 330 so that MUX 250 receives data from elastic buffer 330. In one embodiment, the jam signal has a dual meaning: the jam signal directs elastic buffer 330 to withhold data for a period of time in which the timestamp is to be transmitted by packet/frame processing module 340, and the jam signal also controls MUX 250.

In another example, when the packet/frame processing module 340 determines that a particular packet/frame is to be modified by adding a timestamp (through appending or modifying an IP packet header, for example), the packet/frame in elastic buffer 330 is jammed. When idles are transmitted by the elastic buffer 330, the packet/frame processing module 340 modifies the captured packet/frame with timestamp information and updates the IP packet header. The packet/frame processing module 340 injects the modified packet/frame into the output stream by instructing MUX 250 to switch streams.

While such packet/frame injection may only occur occasionally, the injection can usually be accommodated by reducing any incoming inter-frame gaps to a minimum duration (which is described in "Method For Creating a Low Bandwidth Channel Within a High Bandwidth Packet Stream," application Ser. No. 10/688,340, filed Oct. 17, 2003, the entire disclosure of which is hereby incorporated by reference).

Figure 4:
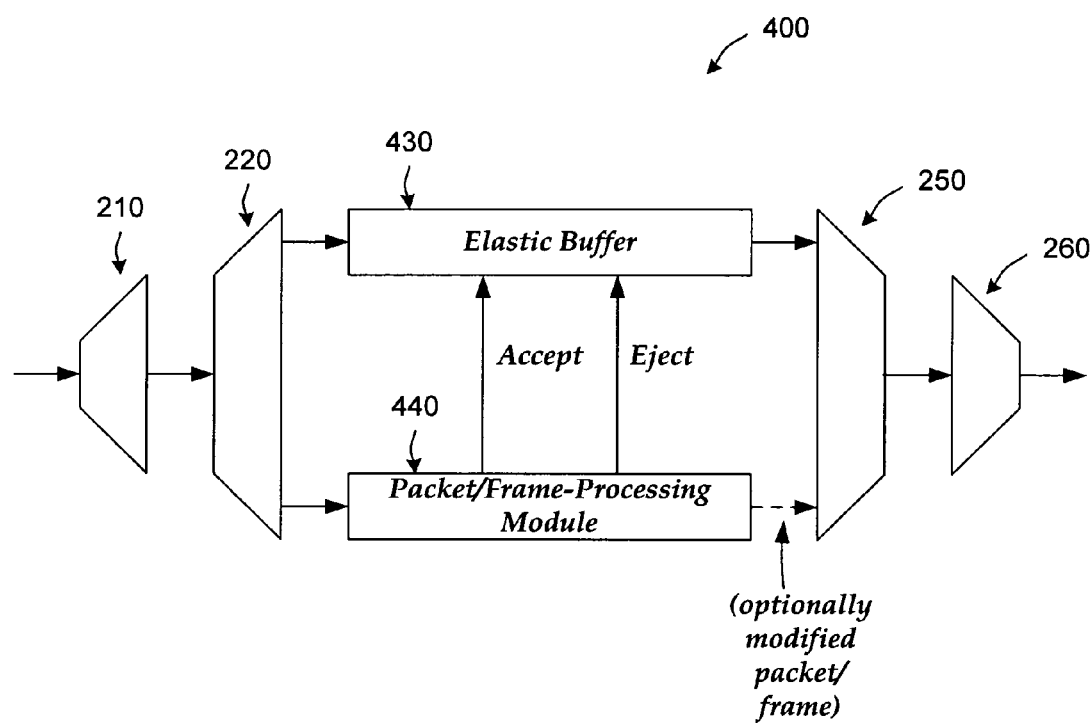
FIG. 4 illustrates an embodiment of an in-band packet frame inspection device 400 operating in the slow mode.

FIG. 4 illustrates an embodiment of an in-band packet frame inspection device 400 operating in the slow mode. In the slow mode, the elastic buffer 430 is normally large enough to accommodate any (legal) entire packet/frame. When the packet/frame is in the process of being inspected, the packet/frame is withheld in the elastic buffer 430. When the start of a packet/frame appears in the elastic buffer 430, the elastic buffer 430 repeatedly transmits the last idle character until a signal is received from the packet/frame processing module 440.

There are commonly two types of signals used in slow mode: "eject" and "accept." The accept signal directs the elastic buffer 430 to transmit a (previously) received packet/frame, and the eject signal directs the elastic buffer 430 to drop the entire received packet/frame (so that the packet/frame is not transmitted). The packet/frame processing module 440 normally continues to send idles until the next packet/frame starts to arrive. If the packet/frame processing module 440 determines that the previously received packet/frame is to be modified, it modifies the previously received packet/frame, and sends an EJECT signal to the elastic buffer and contemporaneously begins to transmit the modified packet/frame data by controlling MUX 250.

All packet processing is normally completed before the end of the packet/frame is received. Otherwise, information may be "dropped" when the link is fully utilized, (such as when there is no way to accommodate the packet/frame processing by decreasing the number of inter-frame gap idles). The ACCEPT signal can be issued as soon as the packet/frame processing module 440 has completed inspecting the packet/frame.

For example, in a port blocking case, as soon as the port address is evaluated (and found to be a non-blocked address), the packet/frame processing module 440 can issue an "accept" signal. Thus, the elastic buffer 430 may start sending out information before the arrival of the end of a packet/frame. However, the packet/frame processing module 440 normally waits until the end (or near the end) of a packet/frame when the entire packet has to be examined before issuing the accept signal. The accept signal can be issued near the end of the packet/frame when, for example, the CRC is in the process of arriving. As mentioned above with respect to the "A Method of Creating Low-Bandwidth Channel within a Packet Stream" disclosure, any introduced delays can be eliminated when the incoming inter-frame gaps are longer than the minimum period for an inter-frame gap.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An in-band packet/frame inspection apparatus, comprising:
    an input module configured to receive a packet/frame;
    an elastic buffer configured to buffer the received packet/frame and to output buffered data;
    a packet/frame processing module configured to inspect the received packet/frame, and in response to a result of the inspection: to provide at least one elastic buffer control signal and an instruction, wherein the elastic buffer outputs the buffered data in response to the at least one elastic buffer control signal; and
    an output module configured to receive the instruction from the packet/frame processing module and in response to the instruction, to selectively transmit one of: (1) the buffered data received from the elastic buffer, and (2) data received from the packet/frame processing module.

2. The apparatus of claim 1 wherein the packet/frame processing module is configured to operate in one of a fast mode and a slow mode, wherein the output module is configured to transmit data after a port field of the packet/frame has been received in fast mode, and wherein the output module is configured to transmit data when a checksum of the packet/frame is being received in slow mode.

3. The apparatus of claim 1 wherein the elastic buffer control signal comprises a jam signal.

4. The apparatus of claim 3 wherein the received packet/frame is modified in response to the jam signal by making the checksum invalid.

5. The apparatus of claim 3 wherein the received packet/frame is modified in response to the jam signal by corrupting the framing whereby a network device receiving the modified packet/frame detects that the received modified packet/frame is invalid.

6. The apparatus of claim 3 wherein the jam signal is asserted in accordance with a packet/frame filter matching predetermined packet/frame filter values.

7. The apparatus of claim 3 wherein the jam signal is asserted when a pattern within the received packet/frame matches predetermined pattern values.

8. The apparatus of claim 1 wherein the at least one elastic buffer control signal comprises an eject signal.

9. The apparatus of claim 8 wherein the at least one elastic buffer control signal further comprises an accept signal.

10. The apparatus of claim 9 wherein the accept signal directs the elastic buffer to forward the received packet/frame.

11. The apparatus of claim 8 wherein the eject signal directs the elastic buffer to not transmit the received packet/frame.

12. The apparatus of claim 9 wherein the accept signal is issued when the CRC of the packet/frame is arriving at the input port and the received packet/frame passes inspection for being a packet/frame that is good for forwarding.

13. An in-band packet/frame inspection apparatus, comprising:
   an input module configured to receive a packet/frame;
   an input duplicator configured to create a first stream and a second stream in response to the reception of the packet/frame;
   an elastic buffer configured to receive the first stream;
   packet/frame processing module configured to receive the second stream and to inspect data from the packet/frame in the second stream and in response to a result of the inspection: to provide at least one elastic buffer control signal and an instruction, wherein the elastic buffer outputs the buffered data in response to the at least one elastic buffer control signal; and
   an output multiplexer configured to receive the instruction from the packet/frame processing module and in response to the instruction received from the packet/frame processing module switch between: (1) outputting an output of the elastic buffer; and (2) outputting the output of the packet/frame processing module.

14. The apparatus of claim 13 wherein the packet/frame processing module is further configured to modify the second stream by injecting a timestamp into the second stream.

15. The apparatus of claim 13 wherein the packet/frame processing module is further configured to adjust the length field in a protocol header within the second stream.

16. The apparatus of claim 13 wherein the packet/frame processing module is further configured to send the modified packet/frame in the second stream and reject the original packet/frame in the first stream.

17. A method of inspecting and transmitting a packet/frame, the method comprising:
   receiving a packet/frame;
   buffering the received packet/frame in an elastic buffer;
   inspecting the received packet/frame by a packet/frame processing module, and in response to a result of the inspection: providing at least one elastic buffer control signal and an instruction, wherein the elastic buffer outputs the buffered data in response to the at least one elastic buffer control signal; and
   in response to the instruction, selectively transmitting one of: (1) data received from the elastic buffer; and (2) data received from the packet/frame module.

18. The method of claim 17 wherein the at least one elastic buffer control signal comprises a jam signal that is asserted in accordance with data of the packet/frame matching at least one predetermined pattern.

19. The method of claim 17 wherein the at least one elastic buffer control signal comprises an eject signal.

20. The method of claim 18 wherein the at least one elastic buffer control signal further comprises an accept signal that is issued when the CRC of the packet/frame is arriving at the input port.

* * * * *

UNITED STATES PATENT AND TRADEMARK OFFICE
CERTIFICATE OF CORRECTION

| | | |
|---|---|---|
| PATENT NO. | : 8,194,662 B2 | Page 1 of 1 |
| APPLICATION NO. | : 11/450805 | |
| DATED | : June 5, 2012 | |
| INVENTOR(S) | : Ilnicki et al. | |

It is certified that error appears in the above-identified patent and that said Letters Patent is hereby corrected as shown below:

Title page, Item (76) Inventors: "Slawomir K. Ilnickl" should read -- Slawomir K. Ilnicki --

Col. 7, in claim 13, line 24, "packet/frame processing module" should read -- a packet/frame processing module --

Signed and Sealed this
First Day of January, 2013

David J. Kappos
*Director of the United States Patent and Trademark Office*